(12) United States Patent
Butt

(10) Patent No.: US 6,728,964 B1
(45) Date of Patent: Apr. 27, 2004

(54) MONITORING FUNCTION

(75) Inventor: Alan B. Butt, Orem, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/096,997

(22) Filed: Jun. 13, 1998

(51) Int. Cl.[7] .................................................. G06F 9/46
(52) U.S. Cl. ........................ 719/313; 719/312; 719/328; 718/100; 707/8
(58) Field of Search ................................ 709/318, 100, 709/319, 312, 107, 108, 310–313, 328; 707/1, 2, 8, 9; 718/100, 107, 108; 719/310–313, 328

(56) References Cited

U.S. PATENT DOCUMENTS

| | | | | |
|---|---|---|---|---|
| 5,257,381 A | * | 10/1993 | Cook | 209/318 |
| 5,491,808 A | * | 2/1996 | Geist, Jr. | 711/100 |
| 5,696,702 A | * | 12/1997 | Skinner et al. | 702/186 |
| 5,701,463 A | * | 12/1997 | Malcolm | 707/10 |
| 5,740,370 A | * | 4/1998 | Battersby et al. | 709/219 |
| 5,956,481 A | * | 9/1999 | Walsh et al. | 223/66 |
| 5,956,507 A | * | 9/1999 | Shearer et al. | 709/104 |
| 6,081,664 A | * | 6/2000 | Nowlin, Jr. | 717/127 |
| 6,272,519 B1 | * | 8/2001 | Shearer et al. | 709/104 |
| 2002/0033838 A1 | * | 3/2002 | Krueger et al. | 345/700 |

OTHER PUBLICATIONS

Cowart, Robert. "Mastering Windows 3.1 Special Edition." SYBEX Inc. 1993.*
Chambers et al., "Typecheckin and Modules for Multi-Methods" Oct. 1994, OOPSLA/ACM, pp. 1–15.*
Bohannon et al., "Recoverable User-Level Mutual Exclusion" Dec. 1995, IEEE, pp. 293–301.*

* cited by examiner

Primary Examiner—John Follansbee
Assistant Examiner—Lewis A. Bullock, Jr.
(74) Attorney, Agent, or Firm—Trop, Pruner & Hu, P.C.

(57) ABSTRACT

A real time blocking hook enables foolproof monitoring of various global functions such as file open. In this way, a scanning functionality may be implemented which prevents execution of the file before scanning is complete. The address of the open routines may be obtained using a DLL. Advantageously, an intertask send message is utilized to communicate between the DLL, the client and the monitoring function since the ability of other functions to bypass the intertask send message is substantially eliminated.

25 Claims, 5 Drawing Sheets

MONITORING FUNCTION

BACKGROUND

This invention relates generally to monitoring functions useful with the Windows® 16 bit operating platform.

In a number of program monitoring applications, including scanning for viruses, it is important to prevent file execution prior to the monitoring operation. Other examples of monitoring include metering, protecting access and the like.

U.S. Pat. No. 5,257,381 to Cook teaches the use of an interceptor function for intercepting calls to global functions. Global functions could include file manipulation functions, such as open file. After interception, the interception function calls a monitoring function, such as a virus checker.

A variety of virus detectors exist which have various deficiencies. For example, some virus detectors are not adaptable to the Windows® 16 bit operating platforms. Systems which use virtual device drivers (VxDs) are effective in Windows 95® applications but may be subject to deficiencies when applied to other platforms. For example, the VxD virus detectors may require two copies of the virus checker to be stored. This is because the virus checker and the VxD may operate in different address spaces. As a result, a large amount of memory may be taken up by the two copies of the virus scan engine. In addition, some of these virus checkers may only allow re-booting of the system when a virus is detected.

One desirable attribute in certain monitoring functions is that they be foolproof. By foolproof it is intended to refer to the ability of the software to prevent access by another file that may otherwise bypass the monitoring function. A program would not be a foolproof monitoring function where it allows another file to be opened without monitoring, which might include scanning for viruses in particular applications. When other open calls can get through without being hooked and monitored, it is possible that viruses could infect a given system, causing adverse consequences.

Thus, there is a continuing need for a foolproof monitoring function which does not require duplicate copies of the monitoring function and which is applicable to the Windows® 16 bit operating platform.

SUMMARY

In accordance with one aspect, a method of monitoring that is useful in Windows® 16-bit applications includes obtaining the address of an open file routine. The code at that location is compared to expected code. Control is transferred to an interceptor function when an attempt to open a file is detected.

DETAILED DESCRIPTION

Figure 1:
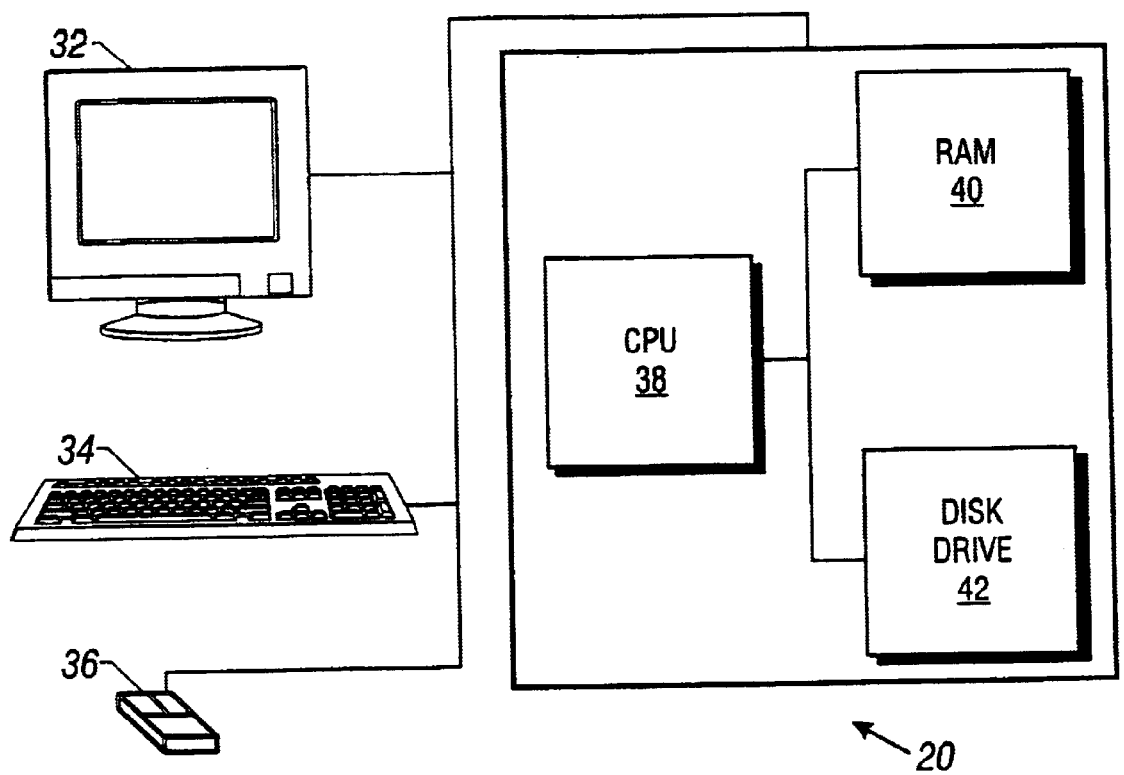
FIG. 1 is a block diagram of a computer.

A computer 20 includes a monitor 32 for visually displaying information to a computer user, as shown in FIG. 1. A keyboard 34 and a mouse 36 allow the computer user to communicate with a central processing unit 38. In one embodiment, the CPU 38 may be a microprocessor including an internal stack. A computer 20 may include random access memory 40 and a disk drive 42. The computer 20 may operate a Microsoft Windows® 16-bit operating platform such as Windows® version 3.1x. An interceptor function is stored in the computer 20 within internal memory 40 or on the disk drive 42.

Figure 2:
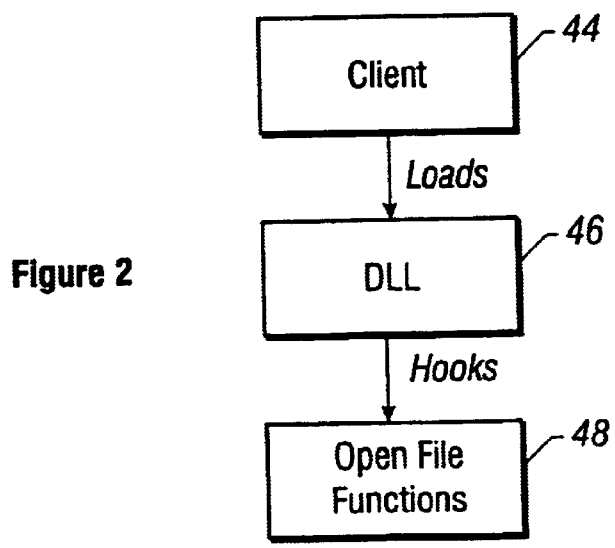
FIG. 2 is a general flow diagram for one embodiment of the present invention.

Referring now to FIG. 2, a client 44 loads a dynamic linked library ("DLL") 46 which in turn hooks a Windows® 16-bit open file function indicated as 48. In particular, the DLL 46 hooks the open file functions OpenFile( ), _Lopeno and LoadModule( ) routines. After release time, the hooks are restored to their original state.

In this way an interceptor function, implemented by the DLL 46, enables Windows® 16-bit open file functions to be monitored, for example, for implementing a virus scan engine. Before the files are opened, possibly infecting the entire system, the DLL hooks the open file function and causes a virus scan engine, at least under certain circumstances, to scan the file and to control whether or not the file is actually opened.

In particular, once the DLL has been loaded and initialized by the client, the DLL hooks attempts to open files by any program running on the Windows® system. It also transfers control to the client program and then scans the file for viruses. If no virus is found, control may be returned to the original program. If a virus is found, action, such as cleaning the virus and notifying the administrator, may take place. In any case, access to the infected file can be optionally denied to the original program thereby preventing the spread of the virus.

For example, a user of Microsoft Word® may attempt to open a document infected with a virus. The DLL 46 intercepts the open attempt before Microsoft Word® actually loads the document into memory which would cause further infection. The client scans the document and detects the virus. The client program then attempts to perform preselected actions such as cleaning the virus, removing the infected file or the like. The client may notify the user that the document is infected and indicate what actions have been performed. The user can also be queried as to whether to allow the open to proceed or to deny the open request. If the user chooses to deny access to the file, an open file failure code is returned to Microsoft Word®.

After the DLL is loaded, entry points are found using the Windows® Application Program Interface (API) GetProcAddress( ). The first function that is called after the DLL is loaded performs a variety of checks. If the operating environment is not as expected, this function returns a failure code to the client. A Windows® 16-bit operating system has different versions which are used in various locales. Specific hooks are used for those various versions. The DLL normally accounts for these differences.

Once these checks are complete, the three Windows® 16-bit entry points or operating system functions are modified. These are _Lopeno, OpenFile( ), and LoadModule( ). The modifications redirect these entry points into code within the DLL. Information about the client program is saved including a window handle where a message is eventually sent and the task handle. This information may be needed to safely pass control to the client when an open file attempt occurs. A second function is called before the client program unloads the DLL. This function simply undoes actions performed by the first function.

A third function can be called by the client to set a file extension list. Files with extensions that are of interest to the user are included in the list. Typical files that are typically monitored for scanning purposes may include files having the extensions .COM, .EXE, .DOC, and .XLS.

The third function also checks to see if a file name is in the DLL's internal name cache. A small cache of previously scanned files is maintained by the DLL. In many applications this may be useful since an open file may occur many times during the load process, particularly with word processors and when Windows® itself performs open attempts. If a file is in the cache, the file is not scanned again but the results of the previous scan are used. Files are identified in the cache by their name and their time stamp. This API is exposed to the client so the client can also check files that are in the cache.

Still another function allows the client program to enable or disable the real time blocking functionality without removing the DLL from memory. This is done by setting the hook state. It allows the client to also obtain statistics from the hook in terms of the number of open attempts, the number of failures, the number of cache hits and the like.

Another function allows the client to flush the internal file name cache. This may be needed if the client changes options such as the extension list. Specifically, it may be desirable to flush the cache so that a new set of most commonly used extensions may be placed into the system.

Figure 3:
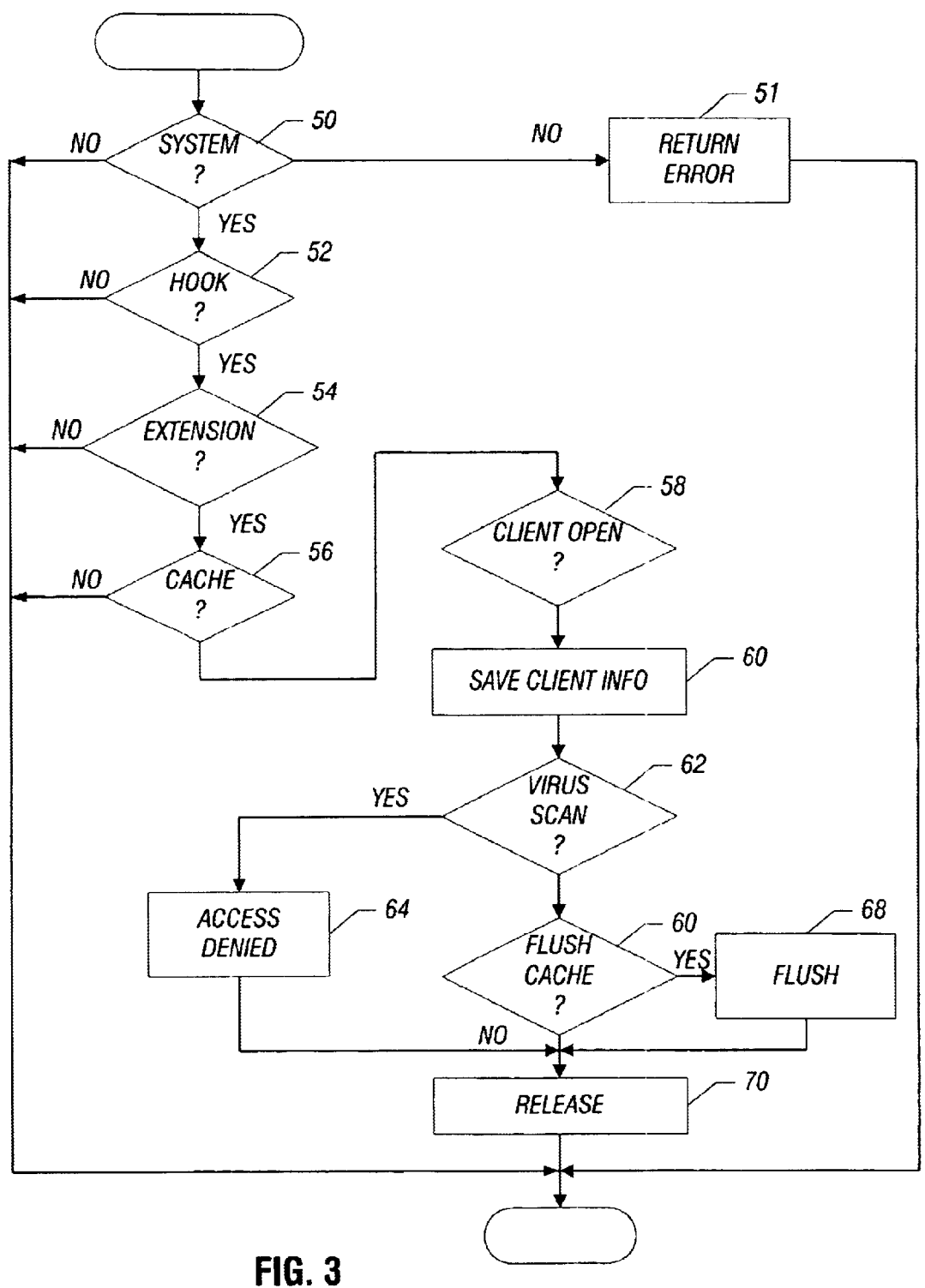
FIG. 3 is a more detailed flow diagram for the embodiment shown in FIG. 2.

Referring to FIG. 3, initially a system check is done as indicated by diamond 50 to determine whether the operating environment is acceptable. If this is not the case, an error is returned, as indicated by block 51.

Next the hook state is determined at diamond 52. If the hook state is appropriate (virus scan selected), an extension check is done at 54 followed by a cache check 56 as described above. A check is made at 58 to determine whether the client is open. Client information is saved at block 60 and a virus scan ultimately occurs at block 62. If the virus scan finds a virus, access is denied as indicated at block 64. Thereafter, a check is made at diamond 66 to determine whether to flush the cache as described above and if so, the cache is flushed as indicated at block 68. Finally, at block 70 a release is performed which undoes actions performed by the hook.

Figure 4:
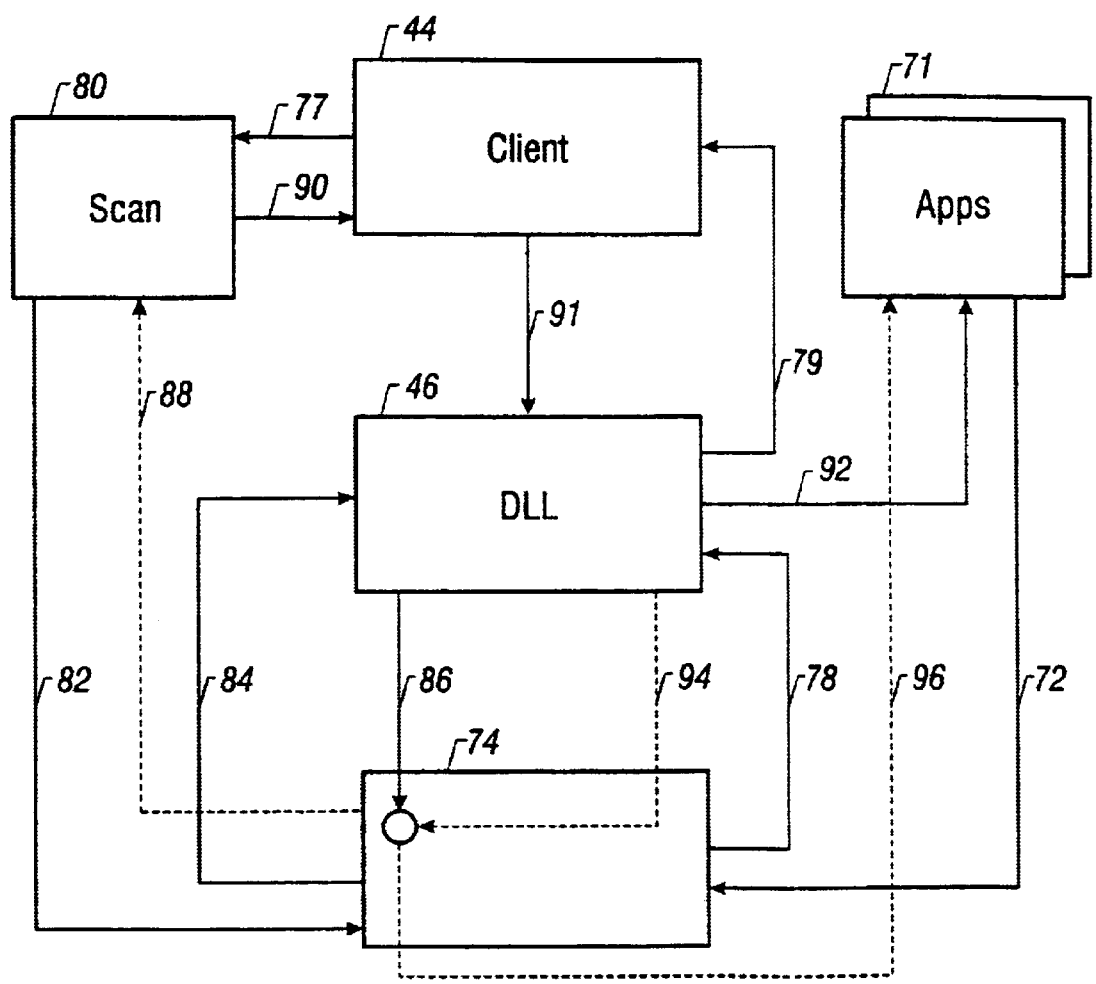
FIG. 4 is a flow diagram of one aspect of the software illustrated in FIG. 2.

Referring now to FIG. 4, initially files are opened via the hooked routines as indicated by arrow 72. Once the DLL has been called, all attempts to open files through the hooked Windows® functions are trapped by the DLL. These attempts act on the attempting program stack and with its task handle. The hook is written so that the DLL is invoked when an application attempts to open a file.

At the hooked Windows® kernel level 74, the hook code may pass control to the DLL 46 via the path 78. The application calls into the kernel and the kernel makes a call into the DLL.

If the file is to be scanned, control is passed to the client 44 from the DLL 46 using an intertask send message 79 to open and scan the file. The intertask send message passes control to the client and does not return control until operations are complete. Thus, other tasks are blocked until the send message completes. The intertask send message is an application or window message.

The operating system then does a task switch to the client's address space. The data sent with the intertask send message is the file to be scanned. The client 44 then calls the monitoring function via path 77, which in the illustrated embodiment is the virus scan engine 80.

The scan engine opens the file to look for viruses by calling the kernel 74 to open the file, using the flow path 82. The hook passes control to the DLL via the path 84. The scan engine open file request is sent through a bypass 86 to go back to the kernel 74 which opens the file in the regular fashion. As a result, a real-time entrance into the operating system open file code occurs. Similarly, if the file is one which is not scanned, the bypass 86 is used to open the file directly. Another task switch occurs and control is passed back to the application.

The scan engine 80 runs as indicated by the dotted line path 88 and the results of the scan are returned to the client via the path 90. The client 44 returns the scanned results to the DLL 46 as indicated at 91. A task switch, indicated at 92, occurs back to the application 71 and the scan engine reports on whether or not a virus was found. An error, access denied, message is provided through the application if a virus is found, but the file is never opened. At this point, an attempt to clean the virus can be implemented.

A real open code allowing the file to be opened may occur if the virus is not present as indicated by the dashed line 94 returning to the kernel 74. Control is then returned to the application, as indicated by the dashed line 96, after performing the open using the bypass hook code. If there is a virus, a dialog may occur that could include proceeding to open even if a virus was found.

Figure 5:
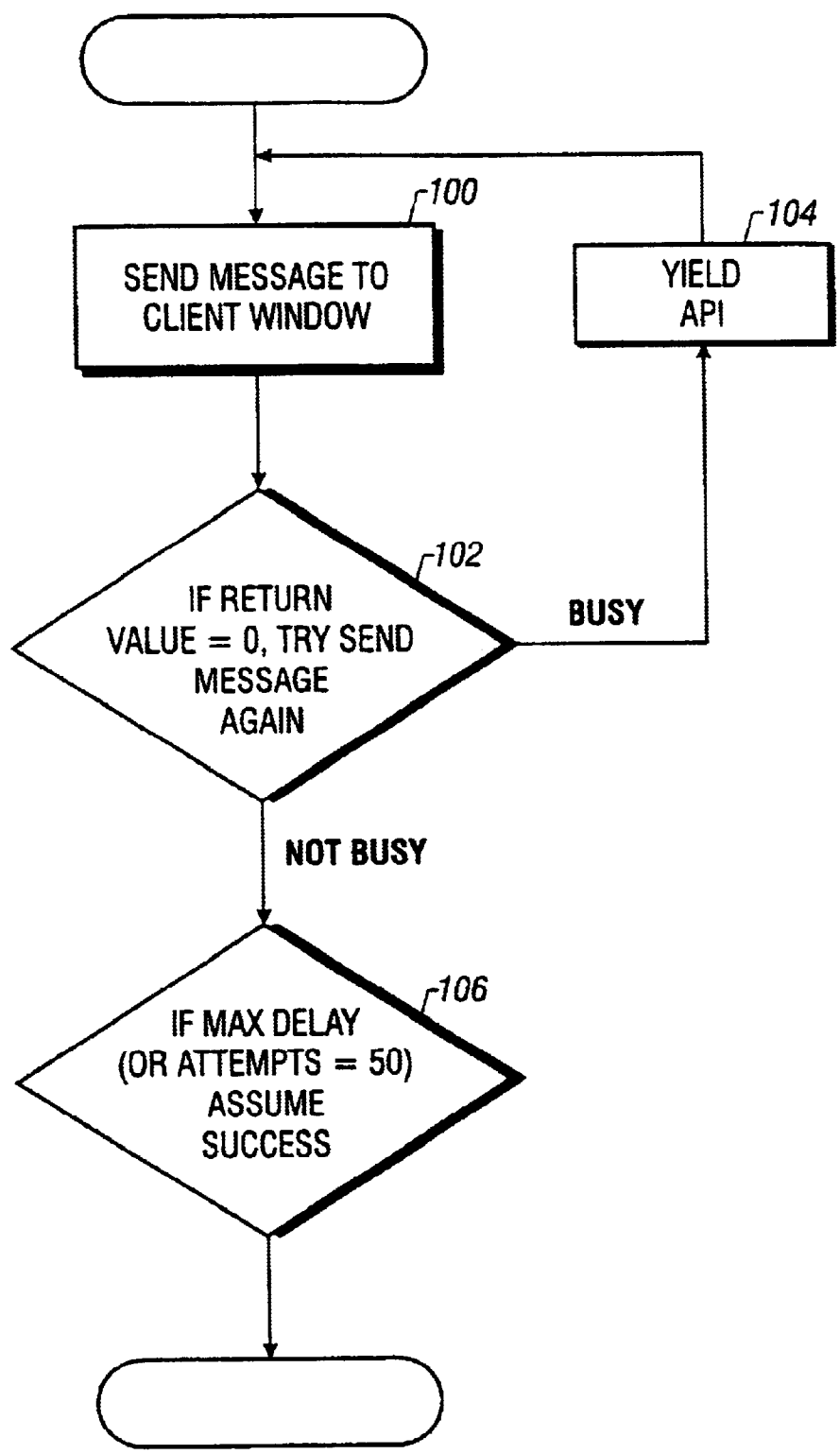
FIG. 5 is a more detailed flow diagram of another aspect of the software illustrated in FIG. 4.

Referring now to FIG. 5, the operation of the hook functionality is illustrated. Control must be transferred to the scan engine which runs as its own task with a different task space. At block 100, a send message to client window command passes a pointer to a software results block using the send message API. Any other tasks are then blocked until the send message completes. When the virus scan engine is busy, an issue arises as to whether or not another file could be opened without being scanned by the scan engine. To avoid this possibility, a check of the scan engine activity is made at diamond 102. If the return value equals 0 indicating that the scanner is busy, the send message is tried again. If, in fact, the scan engine is still busy, a yield API 104 is used the implement a yield access function. The yield API allows the calling function to delay. This causes the operation to wait for the other code to complete so there is no risk of a file opening without being scanned. The yield API has been found to very effective in preventing such sidestepping of the scan engine. This makes the interceptor function relatively foolproof.

If a maximum amount of delay or a maximum number of attempts have occurred, the process simply assumes success and proceeds as indicated in block 106. In this situation, it is likely that there is a failure state and it is relatively unlikely that there is a virus. Thus, processing is allowed to proceed.

Figure 6:
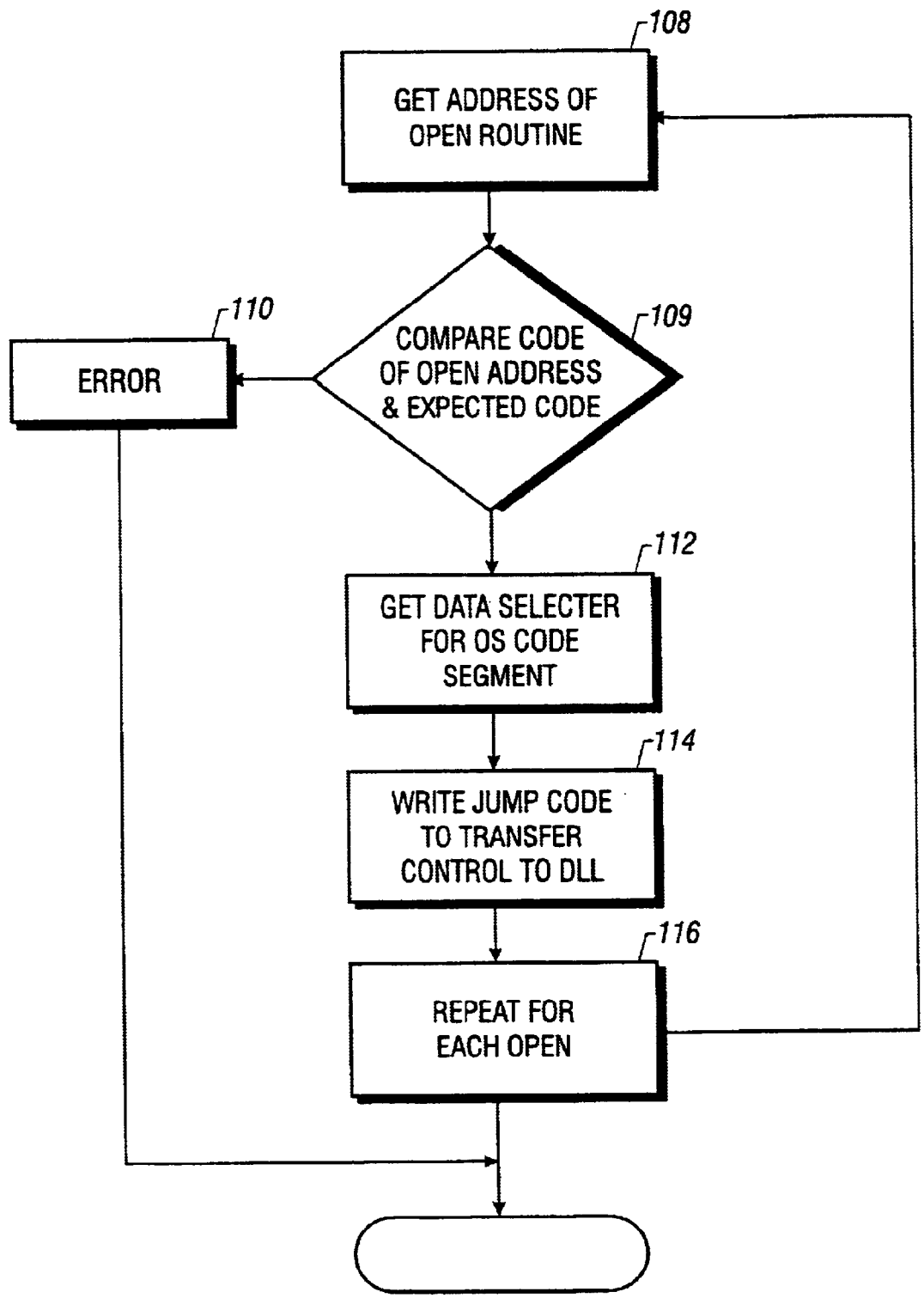
FIG. 6 is a more detailed flow diagram of another aspect of the software illustrated in FIG. 4.

Referring to FIG. 6, at block 108, the address of the open routine is obtained. The operating system indicates the open location (that is, where the loader hook is currently at). A global variable is linked to an operating system relocatable variable for _Lopen, the open command. Thus, when the DLL is loaded it is automatically linked to the open command, regardless of where in memory it was stored by the kernel. A comparison is made at block 109 to determine whether or not the code at the address indicated in block 108 is the expected code. The actual code is compared to stored codes that would be expected to be found at the particular location. If other codes are found, the software is unable to handle the unexpected code.

Thus, if the expected code is not found, an error code is generated at block 110. If the correct code has been located, a data selector is obtained for the operating system code segment (Block 112). This makes a data segment out of the operating system which is normally a code segment.

At block 114, a jump code transfers control to the DLL. There is nothing on the stack when the program jumps down into the routines that actually do the scanning. This process is repeated (Block 116) for each open routine __Lopeno, OpenFile( ), and LoadModule( ).

In this way, a functionality equivalent to that obtained in other Windows® environments including 32-bit Windows® environments, can be obtained with a Windows® 16 bit operating platform. In addition, in certain embodiments, foolproof scanning can be achieved without the possibility of inadvertent bypassing of the monitoring function when the monitoring function receives two requests at the same time. Moreover, the need to load two different copies of the monitoring function into memory is avoided.

While the present invention has been described with respect to a limited number of preferred embodiments, those skilled in the art will appreciate numerous modifications and variations. It is intended that the appended claims cover all such modifications and variations as fall within the true spirit and scope of the present invention.

What is claimed is:

1. A method of monitoring that is useful in 16-bit applications comprising:
   obtaining an address of an open file routine for an address space accessible by at least two tasks at the same time;
   comparing code found at the address of the open file routine to an expected code;
   transferring control to an interceptor function when an attempt to open a file is detected;
   using the interceptor function for one task of said at least two tasks to examine the file;
   preventing another task of said at least two tasks from accessing the address space while said one task is examining the file; and
   making a request to a monitoring function, determining whether a monitoring function is busy and if so repeating the request while implementing a yield function.

2. The method of claim 1 including transferring control to a client using an intertask message.

3. The method of claim 1 including linking a global variable to an operating system relocatable variable for an open command.

4. A method of monitoring that is useful in 16-bit applicatons comprising:
   implementing a real time blocking hook to call a monitoring function for execution in an address space accessible by at least two tasks at the same time based on a request to open a file from the monitoring function;
   using the monitoring function for one task of said at least two tasks to examine the file;
   preventing another task of said at least two tasks from accessing the address space while said one task is examining the file;
   checking to determine whether the monitoring function is busy; and
   if the monitoring function is busy, implementing a yield Application Program Interface.

5. The method of claim 4 including sending a message to a client using a send message Application Program Interface.

6. The method of claim 5 including retrying said send message if the monitoring function is busy.

7. The method of claim 6 including assuming success of the send message after a predetermined delay.

8. The method of claim 4 including obtaining the address of an open file routine.

9. The method of claim 8 including comparing the code of the address of the open file routine to expected code.

10. The method of claim 9 including linking a global variable to an operating system relocatable variable for an open command.

11. The method of claim 10 including transferring control to a client using an intertask message.

12. A method of monitoring useful in 16-bit applications comprising:
   obtaining an address of an open file routine for an address space accessible by at least two tasks at the same time;
   comparing code of the address of the open file routine to an expected code;
   transferring control to an interceptor function when an attempt to open a file is detected;
   implementing a real time blocking hook for a request to open a file based on the interceptor function in the address space;
   using the interceptor function for one task of said at least two tasks to examine the file;
   preventing another task of said at least two tasks from accessing the address space while said one task is examining the file; and
   sending a message to a client using a send message Application Program Interface.

13. The method of claim 12 including transferring control to a client using an intertask message.

14. The method of claim 12 including linking a global variable to an operating system relocatable variable for an open command.

15. The method of claim 14 including retrying said send message if the monitoring function is busy.

16. The method of claim 15 including assuming success of the send message after a predetermined delay.

17. An article comprising a computer readable medium storing instructions to enable a computer to:
   obtain an address of an open file routine for an address space accessible by at least two tasks at the same time;
   compare code of the address of the open file routine to an expected code;
   transfer control to an interceptor function when an attempt to open a file is detected;
   use the interceptor function for one task of said at least two tasks to examine the file; and
   prevent another task of said at least two tasks from accessing the address space while said one task is examining the file.

18. An article comprising a computer readable medium storing instructions to enable a computer to:
   implement a real time blocking hook for a request from a monitoring function to open a file in an address space accessible by at least two tasks at the same time;
   use the monitoring function for one task of said at least two tasks to examine the file;
   prevent another task of said at least two tasks from accessing the address space while said one task is examining the file;

check to determine whether the monitoring function is busy; and if the monitoring function is busy, implement a yield Application Program Interface.

19. An article comprising a computer readable medium storing instructions that enable a computer to:

obtain an address of an open file routine for an address space accessible by at least two tasks at the same time;

compare code of the address of the open file routine to an expected code;

transfer control to an interceptor function when an attempt to open a file is detected;

implement a real time blocking hook for a request to open the file based on the interceptor function in the address space;

use the interceptor function for one task of said at least two tasks to examine the file; and prevent another task of said at least two tasks from accessing the address space while said one task is examining the file.

20. A method comprising:

obtaining from a shared address space an address of a system service associated with an operating system;

using a hook function in a dynamic link library to modify the system service, wherein the dynamic link library to call the system service to implement an Application Program Interface; and enabling a real-time access to a system service code of the operating system for the system service in a different address space than the shared address space.

21. The method of claim 20 further including intercepting a section of executing code when an access to the system service is detected.

22. The method for claim 21 further including using for the different address space a non-shared address space that is independent of and transparent to the common address space to optionally block the access to the system service.

23. The method of claim 22 further comprising switching control to a scan engine to scan a file when the system service is an open file routine.

24. The method of claim 23 further comprising providing a kernel-level hooking to monitor an attempt to open the file.

25. The method of claim 24 further comprising:

receiving an indication from the scan engine for the attempt; and selectively executing the open file routine in response to the indication.

* * * * *

UNITED STATES PATENT AND TRADEMARK OFFICE
CERTIFICATE OF CORRECTION

PATENT NO. : 6,728,964 B1
DATED : April 27, 2004
INVENTOR(S) : Alan B. Butt

It is certified that error appears in the above-identified patent and that said Letters Patent is hereby corrected as shown below:

Column 7,
Line 5, delete "file." and insert the following:
-- file; and
making a request to a monitor function, determining whether a monitoring function is busy and if so repeating request while implementing a yield function. --

Signed and Sealed this

Third Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,728,964 B1
DATED         : April 27, 2004
INVENTOR(S)   : Alan B. Butt It is certified that error appears in the above-identified patent and that said Letters Patent is hereby corrected as shown below:

Column 6,
Line 57, delete "file." and insert the following:
-- file; and
    making a request to a monitoring function, determining whether a monitoring function is busy and if so repeating the request while implementing a yield function. --

Signed and Sealed this

Second Day of November, 2004

JON W. DUDAS
*Director of the United States Patent and Trademark Office*